(12) United States Patent
Nishimoto et al.

(10) Patent No.: US 8,911,880 B2
(45) Date of Patent: Dec. 16, 2014

(54) ROTOR OF ROTATING MACHINE AND METHOD OF MANUFACTURING THE ROTOR

(75) Inventors: Shin Nishimoto, Tokyo (JP); Takashi Nakano, Tokyo (JP); Yoshinori Tanaka, Tokyo (JP); Tatsuaki Fujikawa, Tokyo (JP); Kenji Kawasaki, Hyogo (JP); Yoshikuni Kadoya, Hyogo (JP); Ryuichi Yamamoto, Hyogo (JP); Yuichi Hirakawa, Hyogo (JP); Takashi Shige, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1216 days.

(21) Appl. No.: 12/674,242

(22) PCT Filed: Jun. 11, 2009

(86) PCT No.: PCT/JP2009/061058
§ 371 (c)(1),
(2), (4) Date: Apr. 14, 2010

(87) PCT Pub. No.: WO2009/154243
PCT Pub. Date: Dec. 23, 2009

(65) Prior Publication Data
US 2010/0296938 A1 Nov. 25, 2010

(30) Foreign Application Priority Data
Jun. 18, 2008 (JP) ................................ 2008-159262

(51) Int. Cl.
*C21D 9/50* (2006.01)
*B64C 11/10* (2006.01)
*B23K 31/02* (2006.01)
*F01D 5/06* (2006.01)

(52) U.S. Cl.
CPC ............. *F01D 5/063* (2013.01); *B23K 2203/04* (2013.01); *B23K 2203/18* (2013.01); *F05D 2300/132* (2013.01); *B23K 31/02* (2013.01); *B23K 2201/06* (2013.01); *B23K 2201/001* (2013.01)
USPC ......................................... 428/679; 148/579

(58) Field of Classification Search
None
See application file for complete search history.

(56) References Cited

U.S. PATENT DOCUMENTS 6,152,697 A 11/2000 Konishi et al.
6,753,504 B2 6/2004 Keller et al.

(Continued)

FOREIGN PATENT DOCUMENTS

CN 101158289 4/2008
JP 58-103972 6/1983

(Continued)

OTHER PUBLICATIONS

English Machine Translation of JP 2008-088525, translated Aug. 11, 2013.*

(Continued)

*Primary Examiner* — Adam Krupicka
(74) *Attorney, Agent, or Firm* — Wenderoth, Lind & Ponack, L.L.P.

(57) ABSTRACT

A turbine rotor which is composed by connecting Ni-based alloy and heat resisting steel such as 12-Cr steel by welding to be able to ensure strength of welded parts and can be used under steam conditions of 700° C. class and method of manufacturing the rotor are also provided. The rotor of the rotating machine into which working fluid of 650° C. or higher is introduced, the rotor being composed of a plurality of members connected by welding such that material of each member is different in accordance with temperature of working fluid which flows contacting the members, wherein the first member(s) is formed from Ni-based alloy having mean linear expansion coefficient of $12.4 \times 10^{-6}/°C. \sim 14.5 \times 10^{-6}/°C.$, preferably $14.0 \times 10^{-6}/°C.$ or smaller within a temperature range from a room temperature to 700° C. and second member(s) is formed from high-chrome steels, and the rotor is composed such that the first member(s) formed from Ni-base alloy is located in a portion which contact to the working fluid of 650° C. or higher.

14 Claims, 2 Drawing Sheets

(56) References Cited

U.S. PATENT DOCUMENTS

| | | | |
|---|---|---|---|
| 2003/0024609 A1* | 2/2003 | Morinaga et al. | 148/325 |
| 2005/0106012 A1 | 5/2005 | Scarlin | |
| 2007/0253812 A1 | 11/2007 | Yamashita | |
| 2008/0085192 A1 | 4/2008 | Fukuda et al. | |
| 2009/0123290 A1 | 5/2009 | Imano et al. | |
| 2011/0126945 A1 | 6/2011 | Nishimoto et al. | |

FOREIGN PATENT DOCUMENTS

| | | |
|---|---|---|
| JP | 8-170132 | 7/1996 |
| JP | 2000-64805 | 2/2000 |
| JP | 2000-282808 | 10/2000 |
| JP | 2002-121654 | 4/2002 |
| JP | 2002-307169 | 10/2002 |
| JP | 2003-13161 | 1/2003 |
| JP | 2005-121023 | 5/2005 |
| JP | 2006-291344 | 10/2006 |
| JP | 2007-291966 | 11/2007 |
| JP | 2007-321630 | 12/2007 |
| JP | 2008-88525 | 4/2008 |
| JP | 2008-93668 | 4/2008 |
| JP | 2010-65547 | 3/2010 |

OTHER PUBLICATIONS

English translation of JP 2003-013161, Yamamoto et al., printed Dec. 19, 2013.*

Japanese Office Action issued Jul. 13, 2012 in corresponding Japanese Patent Application No. 2010-502366 with English translation.
International Search Report issued Sep. 15, 2009 in International (PCT) Application No. PCT/JP2009/061065.
International Preliminary Report on Patentability and Written Opinion of the International Searching Authority issued Feb. 17, 2011 in International (PCT) Application No. PCT/JP2009/061065.
Notice of Allowance issued May 30, 2012, in U.S. Appl. No. 12/673,414.
International Preliminary Report on Patentability and Written Opinion of the International Searching Authority issued Feb. 17, 2011 in International (PCT) Application No. PCT/JP2009/061058.
International Search Report issued Sep. 29, 2009 in International (PCT) Application No. PCT/JP2009/061058.
Chinese Notice of Allowance dated Oct. 20, 2011 issued in corresponding Chinese Application No. 200980100093.2.
Chinese Office Action dated Apr. 19, 2012 issued in corresponding Chinese Application No. 200980100052.3.
Chinese Notice of Allowance dated Feb. 1, 2013 issued in corresponding Chinese Application No. 200980100052.3 with English translation thereof.
Notice of Allowance dated Jan. 16, 2014 issued in related Japanese Application No. 2010-517953 (with English translation).
Notice of Allowance dated Aug. 22, 2014 issued in related Korean Application No. 10-2010-7001474 (with English translation).
Notice of Allowance dated Sep. 26, 2012 issued in corresponding Korean Application No. 10-2010-7002531 (with English translation).

* cited by examiner

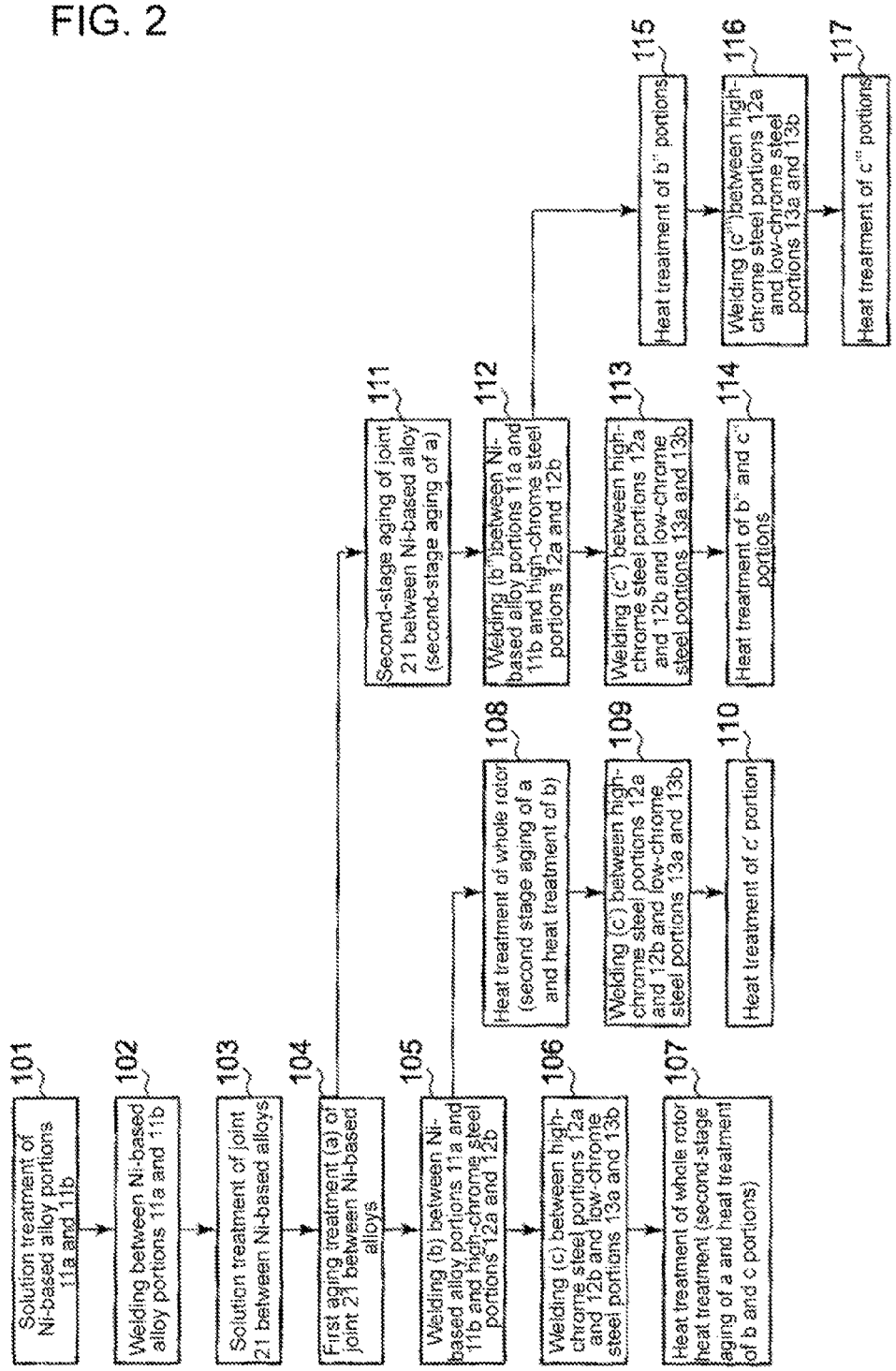

ROTOR OF ROTATING MACHINE AND METHOD OF MANUFACTURING THE ROTOR

TECHNICAL FIELD

The present invention relates to a rotor of a rotating machine such as a steam turbine, the rotor being composed of a plurality of members connected by welding such that material of each member is different in accordance with temperature of working fluid such as steam which flows contacting the member, and a method of manufacturing the rotor.

BACKGROUND ART

The three methods of atomic power, thermal power, and hydraulic power are now used as main power generation methods, and from a viewpoint of resource quantity and energy density, the three power generation methods are also expected to be used as the main power generation methods in the future. Especially, since thermal power generation is safe, its utility value is high as a power generation method with high capacity to respond to load change, it is expected that thermal power generation also will also continue to play an important role in the power generation field in the future.

In coal-fired thermal power generation including steam turbines, improvement of efficiency has been advanced since before. Generally, power generation is now performed under steam conditions of 600° C. class or less, and high-chrome steels (ferritic heat-resisting steels), such as 12Cr steel which has thermal resistance to the steam temperature, are used for primary members, such as turbine rotors and moving blades.

Additionally, although power generation techniques which have adopted steam conditions of the 700° C. class have recently been demanded for $CO_2$ emissions reduction and further improvements in thermal efficiency, when steam conditions of the 700° C. class are adopted, strength becomes insufficient in the high-chrome steels (ferritic heat resisting steels), such as the 12Cr steel.

Thus, it is conceivable that Ni-based alloys which have still higher high-temperature strength are applicable as material for turbine rotors. However, since the manufacturing of a large-sized ingot of Ni-based alloys is difficult, enlargement of the turbine rotor is difficult, and very expensive. Therefore, it is not realistic to manufacture the turbine rotor using only Ni-based alloys.

Thus, Patent Document 1 (Japanese Laid-Open Patent Application No. 2008-88525) discloses a turbine rotor provided in a steam turbine into which high-temperature steam of 650° C. or higher is introduced, as a turbine rotor which is made of Ni-based alloys but uses the Ni-based alloys for essential parts and uses iron and steel materials only for other parts. Here, the turbine rotor is constructed such that a part divided into a portion made of the Ni-based alloys and a portion made of CrMoV steels according to steam temperature is connected by welding, and the steam temperatures of a connecting portion between the portion made of the Ni-based alloy and the portion made of the CrMoV steels, and the steam temperature of the portion made of the CrMoV steels are maintained at 580° C. or lower. Additionally, the CrMoV steels include low CrMoV steels which contain 0.85 to 2.5% of Cr by weight %.

However, in the technique disclosed in Patent Document 1, the CrMoV steels include low CrMoV steels which contain 0.85 to 2.5% of Cr by weight %. Thus, in the low CrMoV steels, it is expected that thermal resistance is insufficient in parts other than the part made of the Ni-based alloys. Assuming that high-Chrome steels are used simply instead of said low CrMoV steels, difference in linear expansion coefficient between Ni-based alloys and high-Chrome steels is large and thermal stress in the welded joints will be increased. Therefore, maintaining the strength of the welded joints becomes difficult.

[Literature of prior art]: Patent literature 1 (Japanese Laid-Open Patent Application No. 2008-88525)

SUMMARY OF THE INVENTION

The present invention was made in light of the problems mentioned above, and the object of the invention is to provide a turbine rotor which is composed by connecting Ni-based alloy and heat resisting steel such as 12-Cr steel by welding without decreasing strength of welded parts and can be used under steam conditions of 700° C. class and a method of manufacturing of the rotor.

To attain the object, the present invention proposes a rotor of a rotating machine to which steam or combustion gas is introduced as working fluid, the rotor being composed of a plurality of members connected by welding such that material of each member is different in accordance with temperature of working fluid which flows contacting the members, wherein first member (s) is formed from Ni-based alloys having mean linear expansion coefficient of $12.4 \times 10^{-6}/°$ C. to $14.5 \times 10^{-6}/°$ C., preferably $14.0 \times 10^{-6}/°$ C. or smaller within a temperature range from a room temperature (also referred to as "normal temperature" which is the same herein below) to 700° C. and second member (s) is formed from high-chrome steels, and the rotor is composed such that the first member (s) formed from Ni-based alloys is located in the working fluid inlet zone.

By composing the rotor by connecting the first member or members and the second member or members, tendency of growing in size of turbine rotors can be accommodated.

By forming the first member of Ni-based alloys having mean linear expansion coefficient of $12.4 \times 10^{-6}/°$ C. to $14.5 \times 10^{-6}/°$ C., preferably $14.0 \times 10^{-6}/°$ C. or smaller from room temperature to 700° C. and forming the second member of high-chrome steel, difference of linear expansion coefficient becomes small. Therefore, thermal stress generated in the welded joint part of the first member with second member under operation is small as a result, enough strength can be maintained also in the welded joint.

As the rotor is composed such that the member formed from Ni-based alloys occupy a portion where the rotor is exposed to introduced working fluid near the inlet of the working fluid, such as steam or combustion gas, strength of the rotor at the high temperature portion where temperature rises to about the same temperature as the inlet temperature of the working fluid can be maintained strong enough. Strength in the other portion of the rotor where temperature of the working fluid has fallen from the inlet temperature thereof is enough by using high-chrome steel as the material of the second members.

The rotor of the invention can be applied to a case the rotor is exposed to steam of 700° C. class.

It is preferable that the rotor is composed of at least two first members formed from Ni-based alloys and at least two second members formed from high-chrome steels, the rotor is formed by joining together at least two first members formed from Ni-based alloys by welding, and joining a second member formed from high-chrome steels to the both ends of the member where the first members have been joined together.

With the composition, further growing in size of rotors can be accommodated and design flexibility of rotors can be improved.

It is preferable to connect by welding a third member formed from low-alloy steels to at least one end of the second members formed from high-alloy steels.

Generally, low-alloy steels are good in compatibility with bearing metal. By connecting the third member formed from low-alloy steel to the end of the rotor, processing such as forming welded overlays on the surface of the end portion of the rotor for forming a shaft portion contact with bearing metal becomes unnecessary.

As to chemical composition of Ni-based alloys which has mean linear expansion coefficient of $12.4\times10^{-6}/°$ C. to $14.5\times10^{-6}/°$ C., preferably $14.0\times10^{-6}/°$ C. or smaller from room temperature to 700° C. Ni-based alloys of chemical composition as follows is suitable: $C\leq0.15\%$, $Si\leq1\%$, $Mn\leq1\%$, $Cr=5$ to 15%, one or two or more among Mo, W, and Re; $Mo+(W+Re)/2=17$ to 25%, $Al=0.2$ to 2%, $Ti=0.5$ to 4.5%, $Fe\leq10\%$, $B\leq0.02\%$, $Zr\leq0.2\%$ (one or two among B and Zr), $Al+Ti=2.5$ to 7.0 at %, and balance is Ni and inevitable impurities, where % means percent by weight and at % atomic percent.

Further, Ni-based alloys of chemical composition as follows is also suitable: $C\leq0.15\%$, $Si\leq1\%$, $Mn\leq1\%$, $Cr=5$ to 20%, $Mo=17$ to 26%, $Al=0.1$ to 2.0%, $Ti=0.1$ to 2.0%, $Fe\leq10\%$, $B\leq0.02\%$, $Zr\leq0.2\%$, $Al+Ti\leq1$ to 5.5 at %, W and Re are contained as shown by the following equation; $17\leq Mo+(W+Re)/2\leq27$, and balance is Ni and inevitable impurities.

Further, Ni-based alloys of chemical composition as follows is also suitable: $C\leq0.15\%$, $Si\leq1\%$, $Cr=5$ to 20%, one or two or more among Mo, W, and Re; $Mo+(W+Re)/2=17$ to 27%, $Al=0.1$ to 2%, $Ti=0.1$ to 2%, Nb and Ta; $Nb+Ta/2\leq1.5\%$, $Fe\leq10\%$, $Co\leq5\%$, $B=0.001$ to 0.02%, $Zr=0.001$ to 0.2%, and balance is Ni and inevitable impurities.

Further, Ni-based alloys of chemical composition as follows is also suitable: $C\leq0.15\%$, $Si\leq1\%$, $Mn\leq1\%$, $Cr=5$ to 20%, one or two or more among Mo, W, and Re; $Mo+(W+Re)/2=5$ to 20%, $W\leq10\%$, $Al=0.1$ to 2.5%, $Ti=0.10$ to 0.955%, Nb and Ta; $Nb+Ta/2\leq1.5\%$, $B=0.001$ to 0.02%, $Zr=0.001$ to 0.2%, $Fe\leq4\%$, $Al+Ti+Nb+Ta=2.0$ to 6.5 at %, and balance is Ni and inevitable impurities.

The high-chrome steel is suitable to have mean linear expansion coefficient from room temperature to 700° C. of the high-chrome steel is $11.2\times10^{-6}/°$ C. to $12.4\times10^{-6}/°$ C., and its chemical composition is suitable to be: Cr=over 7% and below 10.0%, $Ni\leq1.5\%$, $V=0.10$ to 0.30%, $Nb=0.02$ to 0.10%, $N=0.01$ to 0.07%, $C\geq0.10\%$, $Si\leq0.10\%$, $Mn=0.05$ to 1.5%, $Al\leq0.02\%$, Mo and W are in a Mo—W graph inside a line connecting coordinate point A(1.75% Mo, 0.0% W), B(1.75% Mo, 0.5% W), C(1.53% Mo, 0.5% W), D(1.3% Mo, 1.0% W), E(2.0% Mo, 1.0% W), F(2.5% Mo, 0.5% W), G(2.5% Mo, 0.0% W), and A, not including the line, and balance is Fe and inevitable impurities.

It is also suitable that the high-chrome steel has average linear thermal expansion coefficient from room temperature to 700° C. of the high-chrome steel is $11.2\times10^{-6}/°$ C. to $12.4\times10^{-6}/°$ C., and its chemical composition is: $C=0.08$ to 0.25%, $Si\leq0.10\%$, $Mn\leq0.10$, $Ni=0.05$ to 1.0%, $Cr=10.0$ to 12.5%, $Mo=0.6$ to 1.9%, $W=1.0$ to 1.95%, $V=0.10$ to 0.35%, $Nb=0.02$ to 0.10%, $N=0.01$ to 0.08%, $B=0.001$ to 0.01%, $Co=2.0$ to 8.0%, and balance is Fe and inevitable impurities.

As the low-alloys steel, 2.25Cr—Mo—V steel or Cr—Mo—V steel is suitable.

The rotor of the rotating machine of the invention may be formed by joining together the first members formed from Ni-based alloys by welding; performing the first-stage aging treatment on the welded joint between the first members, then joining the second member to the member where the first members have been joined together by welding; and then, performing the second-stage aging treatment on the welded joint between the first members, the heat treatment after welding on the welded portion between the first members and the second member simultaneously at the same temperature.

Since the first members and the welded portion between the first members and the second member are brought into a quenched state as welded, the heat treatment after welding according to each joint is necessary in order to ensure the strength property of the welded joint.

Additionally, in the welded portion between the Ni-based alloys, i.e., the welded portion between the first members, it is necessary to perform the first-stage and second-stage aging treatments and to perform heat treatment after welding in the welded portion between the Ni-based alloys and the high-chrome steels, i.e., the welded portion between the first and second members.

When the first members are Ni-based alloys and the second member is high-chrome steels, the temperature condition of the second-stage aging treatment, and the temperature condition of the heat treatment after welding of the welded portion between the first members and the second member are substantially the same.

Thus, it is possible to carry out the second-stage aging treatment of the welded joint between the first members and the heat treatment after welding of the welded joint between the first members and the second members simultaneously and shorten the time required for heat treatment by welding the first members and the second members, and simultaneously performing the second-stage aging treatment of the welded joint between the first members and the heat treatment after welding between the first members and the second members at the same temperature.

In addition, in this case, when heat treatment is not locally performed only on the welded joint between the first members, and the welded portion between the first members and the second member but the whole rotor is heat-treated, this is even effective for prevention of dispersion in residual stress, or deformation.

Further, the rotor of the rotating machine of the invention may be formed by joining together the first members by welding; performing the first-stage aging treatment on the welded joint between the first members, then joining the second member to the member where the first members have been joined together by welding, and joining a third member to the second member by welding; and then, simultaneously performing the second-stage aging treatment on the welded joint between the first members, the heat treatment after welding on the welded portion between the first members and the second member, and the heat treatment after welding on the welded portion between the second member and the third member at the same temperature.

The temperature condition of the second-stage aging treatment on the welded portion between the first members, the temperature condition of the heat treatment after welding of the welded portion between the first members and the second member and the temperature condition of the heat treatment after welding of the welded portion between the second members and the third member are substantially the same.

Thus, it is possible to carryout the second-stage aging treatment of the welded joint between the first members formed from Ni-based alloys, the heat treatment after welding of the welded joint between the first members and the second members and the heat treatment after welding of the welded joint between the second members and the third members simultaneously, and shorten the time required for heat treatment by simultaneously performing the first-stage aging treatment on the welded joint between the first members, the second-stage aging treatment on the welded joint between the first members and the second members, and the heat treatment after welding on the welded joint between the second member and the third member at the same temperature.

In addition, in this case, when heat treatment is not locally performed only on the welded joint between the first members, the welded portion between the first members and the second member and the welded portion between the second members and the third members but the whole rotor is heat-treated, this is even effective for prevention of dispersion in residual stress, or deformation.

Additionally, as a method for attaining the object, the invention proposes a method of manufacturing a rotor of a rotating machine
comprising the steps:
joining together the at least two first members formed from Ni-based alloys having mean linear expansion coefficient of $12.4 \times 10^{-6}/°C. \sim 14.5 \times 10^{-6}/°C.$, preferably $14.0 \times 10^{-6}/°C.$ or smaller averaged from room temperature to 700° C. by welding; performing first-stage aging treatment on the welded joint between the first members, and then, joining a second member formed from high-chrome steels to the both ends of the member where the first members have been joined together by welding; and then, simultaneously performing second-stage aging treatment on the welded joint between the first members, and performing heat treatment after welding on the welded portion between the first members and the second member at the same temperature.

Additionally, the first-stage aging treatment of the welded joint between the first members may be performed at 700 to 1000° C., and the second-stage aging treatment, and the heat treatment after welding of the welded portion between the first members and the second member may be performed at 600 to 800° C.

It is possible to give sufficient strength to each welded portion by performing heat treatment in such a temperature range.

Additionally, the at least two first members may be joined together by welding; the first-stage aging treatment on the welded joint between the first members may be performed, then the second member formed from high-chrome steels may be joined to the both ends of the member where the first members have been joined together by welding, and a third member formed from low-alloy steels may be joined to at least one end of the second member by welding; and then, the second-stage aging treatment on the welded joint between the first members, the heat treatment after welding on the welded portion between the first members and the second member, and the heat treatment after welding on the welded portion between the second member and the third member may be performed simultaneously at the same temperature.

Additionally, the first-stage aging treatment of the welded joint between the first members may be performed at 700 to 1000° C., and the second-stage aging treatment, the heat treatment after welding of the welded portion between the first members and the second member, and the heat treatment after welding of the welded portion between the second member and the third member may be performed at 600 to 800° C.

It is possible to give sufficient strength to each welded portion by performing heat treatment in such a temperature range.

According to the invention as described above, it is possible to provide a turbine rotor which is composed by connecting Ni-based alloys and heat resisting steels such as 12-Cr steels by welding to be able to ensure strength of welded parts and can be used under steam conditions of 700° C. class and a method of manufacturing of the rotor.

BRIEF DESCRIPTION OF THE DRAWINGS

FIG. 2 is a schematic diagram illustrating the manufacturing process of the turbine rotor according to Example 1.

DETAILED DESCRIPTION OF THE PREFERRED EMBODIMENTS

Figure 1:
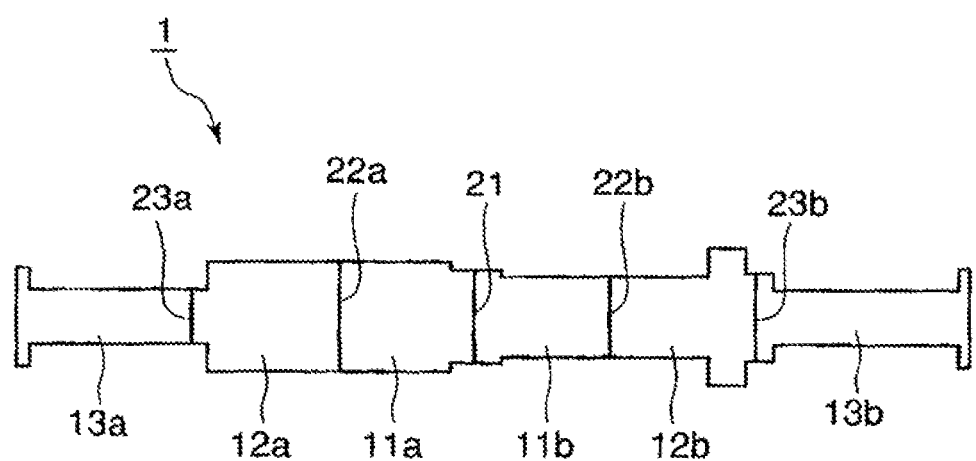
FIG. 1 is a plan view schematically illustrating the configuration of a turbine rotor according to Example 1.

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention. FIG. 1 is a schematic sectional view of a turbine rotor of an embodiment of the invention.

Example 1

FIG. 1 is a plan view schematically illustrating the configuration of a turbine rotor 1 according to Example 1.
(Configuration)
First, the configuration of a turbine rotor used for a steam turbine into which the steam of 650° C. or higher is introduced will be described using FIG. 1.

As shown in FIG. 1, the turbine rotor 1 includes two Ni-based alloy portions 11a and 11b, two high-chrome steel portions 12a and 12b, and two low-chrome steel portions 13a and 13b.

The two Ni-based alloy portions 11a and 11b are joined together by welding to form a welded joint 21, the two Ni-based alloy portions 11a and 11b are joined to the high-chrome steel portions 12a and 12b, respectively, by welding to form welded joints 22a and 22b, respectively, and the high-chrome steel portions 12a and 12b are joined to the low-chrome steel portions 13a and 13b, respectively, by welding to form welded joint 23a and 23b, respectively, whereby a turbine rotor 1 is formed which is integrated in order of the low-chrome steel portion 13a, the welded joint 23a, the high-chrome steel portion 12a, the welded joint 22a, the Ni-based alloy portion 11a, the welded joint 21, the Ni-based alloy portion 11b, the welded joint 22b, the high-chrome steel portion 12b, the welded joint 23b, and the low-chrome steel portion 13b from one end.

Additionally, the Ni-based alloy portions 11a and 11b and the welded joint 21 are arranged in positions exposed to the steam with a temperature of 650° C. or higher, the welded joints 22a and 22b and the high-chrome steel portions 12a, and 12b are arranged in positions exposed to the steam with a temperature of 650° C. or lower, and the welded joints 23a and 23b and low-chrome steel portions 13a, and 13b are arranged in positions of a still lower temperature. It is also possible to set these arrangement temperatures to other temperatures if the arrangement temperatures are equal to or lower than a high-temperature limit at which it is possible to stably use materials which constitute the respective parts.
(Materials)
Next, the materials for the Ni-based alloy portions 11a and 11b which constitute the turbine rotor 1, the high-chrome steel portions 12a and 12b, and the low-chrome steel portions 13a and 13b will be described.

(A) Ni-Based Alloy Portion

The Ni-based alloy portions are preferably formed from Ni-based alloys which have thermal resistance capable of being stably used even at a temperature of 650° C. or higher, preferably about 700° C. and which have a mean linear expansion coefficient of $12.4 \times 10^{-6}/°$ C. to $14.5 \times 10^{-6}/°$ C., preferably $14.0 \times 10^{-6}/°$ C. or smaller within a temperature range from a room temperature to 700° C. By using the Ni-based alloys which have a linear expansion coefficient within the above range, a difference in the linear expansion coefficient between the Ni-based alloy portions 11a and 11b and the high-chrome steel portions 12a and 12b becomes small. Therefore, thermal stress applied to the welded joints 22a and 22b between the Ni-based alloy portions 11a and 11b and the high-chrome steel portions 12a and 12b also becomes small. Accordingly, it becomes easy to secure the strength in the welded joints so the Ni-based alloy portions 11a and 11b and the high-chrome steel portions 12a and 12b can be jointed.

Examples of the Ni-based alloys which have a linear expansion coefficient of $12.4 \times 10^{-6}/°$ C. to $14.5 \times 10^{-6}/°$ C. preferably $14.0 \times 10^{-6}/°$ C. or smaller, include materials having chemical composition ranges of (1) to (4) are summarized in Table 1.

In addition, the Ni-based alloys are not limited the ranges of (1) to (4), and may have other compositions if the Ni-based alloys are Ni-based alloys which have thermal resistance capable of being stably used even at a temperature of 650° C. or higher, preferably about 700° C. and which have a linear expansion coefficient of $12.4 \times 10^{-6}/°$ C. to $14.5 \times 10^{-6}/°$ C., preferably $14.0 \times 10^{-6}/°$ C. or smaller within a temperature range from a room temperature to 700° C.

being stably used up to a temperature of about 650° C. and which have a mean linear expansion coefficient of $11.2 \times 10^{-6}/°$ C. to $12.4 \times 10^{-6}/°$ C. within a temperature range from a room temperature to 700° C. By using the Ni-based alloys which have a linear expansion coefficient within the above range, the difference in linear expansion coefficient between the Ni-based alloy portions 11a and 11b and the high-chrome steel portions 12a and 12b becomes small. Therefore, thermal stress applied to the welded joints 22a and 22b between the Ni-based alloy portions 11a and 11b and the high-chrome steel portions 12a and 12b also becomes small. Accordingly, it becomes easy to secure sufficient strength in the welded joints, so the Ni-based alloy portions 11a and 11b and the high-chrome steel portions 12a and 12b can be joined.

The high-chrome steels which have a linear expansion coefficient of $11.2 \times 10^{-6}/°$ C. to $12.4 \times 10^{-6}/°$ C. includes materials having chemical composition ranges of (5) and (6) are summarized in Table 2.

In addition, the high-chrome steels are not limited the ranges of (5) and (6), and may have other compositions if the high-chrome steels are high-chrome steels which have thermal resistance capable of being stably used up to a temperature of about 650° C. and which have a mean linear expansion coefficient of $11.2 \times 10^{-6}/°$ C. to $12.4 \times 10^{-6}/°$ C. within a temperature range from a room temperature) to 700° C.

12Cr steel which is generally used for the turbine rotor is also contained in the high-chrome steels of such ranges, and 12Cr steel which has conventionally been used for the turbine rotor is able to be used as the high-chrome steels.

TABLE 1

|  | (1) | (1) | (1) | (1) |
|---|---|---|---|---|
| C | ≤0.15% | ≤0.15% | ≤0.15% | ≤0.15% |
| Si | ≤1% | ≤1% | ≤1% | ≤1% |
| Mn | ≤1% | ≤1% | ≤1% | ≤1% |
| Cr | 5~15% | 5~20% | 5~20% | 5~20% |
| Mo | (See below) | 17~26% | (See below) | (See below) |
| W | (See below) | (See below) | (See below) | ≤10% |
| Re | (See below) | (See below) | (See below) | (See below) |
| Al | 0.2~2% | 0.1~2% | 0.1~2% | 0.1~2.5% |
| Ti | 0.5~4.5% | 0.1~2% | 0.1~2% | 0.10~0.95% |
| Nb |  |  | (See below) | (See below) |
| Ta |  |  | (See below) | (See below) |
| B | ≤0.02% | ≤0.02% | 0.001~0.02% | 0.001~0.02% |
| Zr | ≤0.2% | ≤0.2% | 0.001~0.2% | 0.001~0.2% |
| Fe | ≤10% | ≤10% | ≤10% | ≤4% |
| Ni | Bal. | Bal. | Bal. | Bal. |
| Co |  |  | ≤5% |  |
| Other chemical composition | One or two or more among Mo, W, and Re. Mo + (W + Re)/2 = 17~25% 2.5~7.0 at % of(Al + Ti) One or two among B and Zr | 17 ≤ Mo + (W + Re)/2 ≤ 27% 1~5.5 at % of(Al + Ti) | One or two or more among Mo, W, and Re. Mo + (W + Re)/2 = 17~27% Nb + Ta/2 ≤ 1.5% | One or two or more among Mo, W, and Re. Mo + (W + Re)/2 = 5~20% Nb + Ta/2 ≤ 1.5% 2.0~6.5 at % of Al + Ti + Nb + Ta |

% in Table 1 means weight %.

Additionally, although inevitable impurities are also contained in the Ni-based alloys with the compositions of (1) to (4) in Table 1, it is more preferable that the content thereof be closer to 0%.

(B) High-Chrome Steel Portion

The high-chrome steel portions are formed from high-chrome steels, which have thermal resistance capable of

TABLE 2

|  | (5) | (6) |
|---|---|---|
| C | ≥0.10% | 0.08~0.25% |
| Si | ≤0.10% | ≤0.10% |
| Mn | 0.05~1.5% | ≤0.10% |

TABLE 2-continued

|  | (5) | (6) |
|---|---|---|
| Ni | ≤0.15% | 0.05~1.5% |
| Cr | 7~10% | 10~12.5% |
| Mo | (See below) | 0.6~1.9% |
| W | (See below) | 1.0~1.95% |
| V | 0.1~0.3% | 0.1~0.35% |
| Nb | 0.01~0.10% | 0.01~0.10% |
| N | 0.01~0.07% | 0.01~0.08% |
| Al | ≤0.02% | |
| B | | 0.001~0.01% |
| Co | | 2.0~8.0% |
| Fe | Bal. | Bal. |
| Other chemical composition | Mo and W inside a line connecting coordinate point A(1.75% Mo, 0.0% W), B(1.75% Mo, 0.5% W), C(1.53% Mo, 0.5% W), D(1.3% Mo, 1.0% W), E(2.0% Mo, 1.0% W), F(2.5% Mo, 0.5% W), G(2.5% Mo, 0.0% W), and A, not including the line. | |

% in Table 2 means weight %.

Additionally, although inevitable impurities are also contained in the high-chrome steels with the compositions of (5) and (6) in Table 2, it is more preferable that the content thereof be closer to 0%.

(C) Low-Chrome Steel Portion

The low-chrome steel portions may be those which have thermal resistance capable of being stably used up to a temperature from which the low-chrome steel portions having a lower temperature than the high-chrome steel portions rise, and include, for example, 2.25CrMoV steel or CrMoV steel.

In addition, the low-chrome steel portions are not limited to 2.25CrMoV steel or CrMoV steel, and may have other compositions if the low-chrome steels are low-chrome steels which have thermal resistance capable of being stably used even at temperatures from which the low-chrome steel portions having a lower temperature than the high-chrome steel portions rise.

(Manufacturing Method)

Next, a manufacturing method of the turbine 1 will be described referring to FIGS. 1 and 2.

FIG. 2 is a schematic diagram illustrating the manufacturing process (manufacturing method) of the turbine 1 according to Example 1.

Four types of manufacturing processes are shown by a schematic diagram in FIG. 2, and a first manufacturing process is a process of 101→102→103→104→111→112→115→116→117, a second manufacturing process is a process of 101→102→103→104→111→112→113→114, a third manufacturing process is a process of 101→102→103→104→105→108→109→110, and a fourth manufacturing process is 101→102→103→104→105→106→107.

The manufacturing process will be sequentially described below from the first manufacturing process.

(A) First Manufacturing Process

In the first manufacturing process, first, solution treatment of the Ni-based alloy portions 11*a* and 11*b* is performed in 101.

Next, the Ni-based alloy portions are welded in 102, and if needed, solution treatment of the joint 21 between the Ni-based alloys is carried out in 103. Next, (a) first-stage aging of the joint 21 between the Ni-based alloys is performed in 104. The first-stage aging is performed within a range of 700 to 1000° C.

When the first-stage aging is finished in 104, second-stage aging of the joint 21 (*a*) between the Ni-based alloys which has finished the first-stage aging is subsequently performed in 111. The second-stage aging is carried out at 600 to 800° C.

When the second-stage aging is finished in 111, the Ni-based alloy portions 11*a* and 11*b* and the high-chrome steel portions 12*a* and 12*b* are welded together (b″) in 112, and heat treatment of the welded portions (b″) is carried out in 115. This heat treatment is carried out at 600 to 800° C.

When the heat treatment of the welded portions (b″) between the Ni-based alloy portions 11*a* and 11*b* and the high-chrome steel portions 12*a* and 12*b* are finished in 115, the high-chrome steel portions 12*a* and 12*b* and the low-chrome steel portions 13*a* and 13*b* are welded together (c‴) in 116, and heat treatment is performed on the welded portions (c‴) in 117. This heat treatment is carried out at 600 to 800° C.

By the above steps of 101 to 117, the first-stage aging (104) and the second-stage aging (111) are performed on the welded portions between the Ni-based alloys, the heat treatment (115) after welding is performed on the welded portions between the Ni-based alloys and the high-chrome steels, and the heat treatment (117) after welding is performed on the welded portions between the high-chrome steels and the low-chrome steels, so that it is possible to manufacture a rotor in which sufficient strength is given even to the welded joints.

(B) Second Manufacturing Process

Since the second manufacturing process is the same as the first manufacturing process until 112 in FIG. 2, the description thereof is omitted.

When the Ni-based alloy portions 11*a* and 11*b* and the high-chrome steel portions 12*a* and 12*b* are welded together (b″), respectively, in 112, the high-chrome steel portions 12*a* and 12*b* and the low-chrome steel portions 13*a* and 13*b* are then welded together (c″), respectively, in 113.

When the welding (c″) is finished in 113, heat treatment is performed on the welded portions (b″) between the Ni-based alloy portions 11*a* and 11*b* and the high-chrome steel portions 12*a* and 12*b*, and the welded portions (c″) between the high-chrome steel portions 12*a* and 12*b* and the low-chrome steel portions 13*a* and 13*b* in 114. This heat treatment is carried out at 600 to 800° C.

The rotor 1 is manufactured by the above steps.

In the second manufacturing process, heat treatment was simultaneously carried out in 114 after welding was performed in 112 and 113, by utilizing that the heat treatment of the welded portions between the Ni-based alloy portions 11*a* and 11*b* and the high-chrome steel portions 12*a* and 12*b* and the heat treatment of the welded portions between the high-chrome steel portions 12*a* and 12*b* and the low-chrome steel portions 13*a* and 13*b* can be carried out at the same temperature.

Thereby, the manufacture of the turbine rotor 1 becomes possible in a shorter time than the first manufacturing process.

(C) Third Manufacturing Process

Since the third manufacturing process is the same as the first and second manufacturing process until 104 in FIG. 2, the description thereof is omitted.

When the first-stage aging treatment of the joint 21 between the Ni-based alloys is finished in 104, the Ni-based alloy portions 11*a* and 11*b* and the high-chrome steel portions 12a and 12b are welded together (b), respectively, in 105. When the welding is finished, heat treatment is performed on the whole rotor at 600 to 800° C. in 108. Thereby, the second-stage aging of the joint 21 between the Ni-based alloys is accomplished, and the heat treatment after the welding of the welded portions between the Ni-based alloy portions and the high-chrome steel portions are also accomplished.

When the heat treatment is finished in 108, the high-chrome steel portions 12a and 12b and the low-chrome steel portions 13a and 13b are welded together (c') in 109, and heat treatment is performed on the welded portions (c') at 600 to 800° C. in 110.

The rotor 1 is manufactured by the above steps.

In the third manufacturing process, the second-stage aging and heat treatment were simultaneously carried out in 108, by utilizing that the second-stage aging of the joint between the Ni-based alloy portions, and the heat treatment of the welded portions between the Ni-based alloy portions 11a and 11b and the high-chrome steel portions 12a and 12b can be carried out at the same temperature. Thereby, the manufacture of the turbine rotor 1 becomes possible in a shorter time than the first manufacturing process. Additionally, heat-treating the whole rotor in 108 is effective also for prevention of dispersion in residual stress, or deformation.

(D) Fourth Manufacturing Process

Since the fourth manufacturing process is the same as the third manufacturing process until 105 in FIG. 2, the description thereof is omitted.

When the Ni-based alloy portions 11a and 11b and the high-chrome steel portions 12a and 12b are welded together (b), respectively, in 105, the high-chrome steel portions 12a and 12b and the low-chrome steel portions 13a and 13b are then welded together (c), respectively, in 106. When the welding is finished, heat treatment is performed on the whole rotor at 600 to 800° C. Thereby, the second-stage aging of the joint 21 between the Ni-based alloys is accomplished, the heat treatment after the welding of the welded portions between the Ni-based alloy portions and the high-chrome steel portions are also accomplished, and the heat treatment after the welding of the welded portions between the high-chrome steel portions and the low-chrome steel portions is also accomplished.

The rotor 1 is manufactured by the above steps.

In the fourth manufacturing process, the second-stage aging and heat treatment was simultaneously carried out in 107 by utilizing that the second-stage aging of the joint between the Ni-based alloy portions, the heat treatment of the welded portions between the Ni-based alloy portions 11a and 11b and the high-chrome steel portions 12a and 12b, and the heat treatment of the welded portions between the high-chrome steel portions 12a and 12b and the low-chrome steel portions 13a and 13b can be carried out at the same temperature. Thereby, the manufacture of the turbine rotor 1 becomes possible in a shorter time than the first to third manufacturing processes, and heat-treating the whole rotor in 107 is effective also for prevention of dispersion in residual stress, or deformation.

INDUSTRIAL APPLICABILITY

A turbine rotor which is composed by connecting Ni-based alloys and heat-resisting steels such as 12Cr steel by welding without decreasing strength of welded parts and can be used under steam conditions of 700° C. class and method of manufacturing the rotor can be provided.

The invention claimed is:

1. A rotor of a rotating machine to which steam or combustion gas is introduced as working fluid, the rotor being comprised of a plurality of members connected by welding such that material of each member is different in accordance with temperature of working fluid which flows in contact with the plurality of the members, the plurality of the members comprising:
   two first section members; and
   two second section members,
   wherein the two first section members are formed from Ni-based alloys having mean linear thermal expansion coefficient of $12.4 \times 10^{-6}/°C$. to $14.5 \times 10^{-6}/°C$. averaged within a temperature range from a room temperature to 700° C., and the two second section members are formed from high-chrome steels,
   wherein the rotor is composed such that the two first section members formed from Ni-based alloys are located in a working fluid inlet zone,
   and wherein the rotor is formed by joining together the two first section members formed from Ni-based alloys by welding, performing a first-stage aging treatment on a welded joint between the two first section members at 700 to 1000° C., then joining the two second section members to free ends of the two first section members, respectively, by welding, and then, simultaneously performing a second-stage aging treatment on the welded joint between the two first section members and a heat treatment on welded portions between the two first section members and the two second section members respectively, at a same temperature in a range of 600 to 800° C.

2. A rotor of a rotating machine according to claim 1, wherein chemical composition of the Ni-based alloy is: C≤0.15%, Si≤1%, Mn≤1%, Cr=5 to 15%, one or two or more among Mo, W, and Re; Mo+(W+Re)/2=17 to 25%, Al=0.2 to 2%, Ti=0.5 to 4.5%, Fe≤10%, B≤0.02%, Zr≤0.2% (one or two among B and Zr), Al+Ti=2.5 to 7.0 at %, and balance is Ni and inevitable impurities, where % means percent by weight and at % atomic percent.

3. A rotor of a rotating machine according to claim 1, wherein chemical composition of the Ni-based alloy is: C≤0.15%, Si≤1%, Mn≤1%, Cr=5~ to 20%, Mo=17 to 26%, Al=0.1 to 2.0%, Ti=0.1 to 2.0%, Fe≤10%, B≤0.02%, Zr≤0.2%, Al+Ti≤1 to 5.5 at %, W and Re as shown by the following equation; 17%≤Mo+(W+Re)/2≤27%, and balance is Ni and inevitable impurities, where % means percent by weight and at % atomic percent.

4. A rotor of a rotating machine according to claim 1, wherein chemical composition of the Ni-based alloy is: C≤0.15%, Si≤1%, Mn≤1%, Cr=5 to 20%, one or two or more among Mo, W, and Re; Mo+(W+Re)/2=17~27%, Al=0.1 to 2%, Ti=0.1 to 2%, Nb and Ta; Nb+Ta/2≤1.5%, Fe≤10%, Co≤5%, B=0.001 to 0.02%, Zr=0.001 to 0.2%, and balance is Ni and inevitable impurities, where % means percent by weight and at % atomic percent.

5. A rotor of a rotating machine according to claim 1, wherein chemical composition of the Ni-based alloy is: C≤0.15%, Si≤1%, Mn≤1%, Cr=5 to 20%, one or two or more among Mo, W, and Re; Mo+(W+Re)/2=5 to 20%, W≤10%, Al≤=0.1 to 2.5%, Ti=0.10 to 0.95%, Nb and Ta; Nb+Ta/ 21.5%, B=0.001 to 0.02%, Zr=0.001 to 0.2%, Fe≤4%, Al+Ti+Nb+Ta=2.0 to 6.5 at %, and balance is Ni and inevitable impurities, where % means percent by weight and at % atomic percent.

6. A rotor of a rotating machine according to claim 1, wherein mean linear expansion coefficient from room temperature to 700° C. of the high-chrome steel is $11.2 \times 10^{-6}/°C$.

to 12.4×10$^{-6}$/° C., and chemical composition thereof is: Cr=over 7% and below 10.0%, Ni≤1.5%, V=0.10 to 0.30%, Nb=0.02 to 0.10%, N=0.01 to 0.07%, C≤0.10, Si≤0.10%, Mn=0.05 to 1.5%, Al≤0.02%, Mo and W inside a line connecting point A(1.75% Mo, 0.0% W), B(1.75% Mo, 0.5% W), C(1.53% Mo, 0.5% W), D(1.3% Mo, 1.0% W), E(2.0% Mo, 1.0% W), F(2.5% Mo, 0.5% W), G(2.5% Mo, 0.0% W), and A, not including the line, and balance is Fe and inevitable impurities, where % means percent by weight.

7. A rotor of a rotating machine according to claim 1, wherein mean linear expansion coefficient from room temperature to 700° C. of the high-chrome steel is 11.2×10$^{-6}$/° C. to 12.4×10$^{-6}$/° C., and chemical composition thereof is: C=0.08 to 0.25%, Si≤0.10%, Mn≤0.10, Ni=0.05 to 1.0%, Cr=10.0 to 12.5%, Mo=0.6 to 1.9%, W=1.0 to 1.95%, V=0.10 to 0.35%, Nb=0.02 to 0.10%, N=0.01 to 0.08%, B=0.001 to 0.01%, Co=2.0 to 8.0%, and balance is Fe and inevitable impurities, where % means percent by weight.

8. A rotor of a rotating machine according to claim 1, wherein the plurality of the members further comprises a third section member formed from low-alloy steel, the third section member being connected to at least one end of the two second section members formed from high-chrome steels by welding.

9. A rotor of a rotating machine according to claim 8, wherein said low-alloy steel is 2.25Cr—Mo—V steel or Cr—Mo—V steel.

10. A rotor of a rotating machine according to claim 9, wherein the rotor is formed by joining together the two first section members by welding, performing the first-stage aging treatment on the welded joint between the two first section members, then joining the two second section members to the free ends of the two first section members, respectively, by welding, and joining the third section member to the at least one end of the two second section members by welding, and then, simultaneously performing the second-stage aging treatment on the welded joint between the two first section members, the heat treatment on the welded between the two first section members and the two second section members, respectively, and a heat treatment on a welded portion between the at least one end of the two second section members and the third section member at the same temperature.

11. A method of manufacturing a rotor according to claim 8, said method comprising:
joining together the two first section members by welding;
performing the first-stage aging treatment on the welded joint between the two first section members at 700 to 1000° C.; then
joining the two second section members formed from high-chrome steels to the free ends of the two first section members, respectively, by welding, and joining the third section member formed from low-chrome steel to the at least one end of the two second section members by welding; and then
simultaneously performing the second-stage aging treatment on the welded joint between the two first section members, the heat treatment on the welded portions between the two first section members and the two second section members, respectively, and a heat treatment on a welded portion between the at least one end of the two second section members and the third section at the same temperature in the range of 600 to 800° C.

12. A rotor of a rotating machine according to claim 8, wherein the rotor is formed by joining together the two first section members by welding, performing the first-stage aging treatment on the welded joint between the two first section members, then joining the two second section members to the free ends of the two first section members, respectively, by welding, and joining the third section member to the at least one end of the two second section members by welding, and then, simultaneously performing the second-stage aging treatment on the welded joint between the two first section members, the heat treatment on the welded between the two first section members and the two second section members, respectively, and a heat treatment on a welded portion between the at least one end of the two second section members and the third section member at the same temperature.

13. A method of manufacturing a rotor of a rotating machine according to claim 1, said method comprising:
joining together the two first section members formed from Ni-based alloys having mean linear expansion coefficient of 12.4×10$^{-6}$/° C.~14.5×10$^{-6}$/° C. averaged from room temperature to 700° C. by welding;
performing the first-stage aging treatment on the welded joint between the two first section members at 700 to 1000° C.; then
joining the two second section members formed from high-chrome steels to the free ends of the two first section members, respectively; and then
simultaneously performing the second-stage aging treatment on the welded joint between the two first section members and the heat treatment on the welded portions between the two first section members and the two second section members at the same temperature in the range of 600 to 800° C.

14. A rotor of a rotating machine according to claim 1, wherein the two first section members are subjected to a solution treatment before the joining together of the two first section members by welding.

* * * * *